(12) United States Patent
Jordan

(10) Patent No.: US 9,988,187 B2
(45) Date of Patent: Jun. 5, 2018

(54) BEND AND TEAR POSTCARD WITH POCKET

(71) Applicant: Uvalda L. Jordan, Miami, FL (US)

(72) Inventor: Uvalda L. Jordan, Miami, FL (US)

( * ) Notice: Subject to any disclaimer, the term of this patent is extended or adjusted under 35 U.S.C. 154(b) by 16 days.

(21) Appl. No.: 14/882,450

(22) Filed: Oct. 13, 2015

(65) Prior Publication Data
US 2017/0101223 A1 Apr. 13, 2017

Related U.S. Application Data

(63) Continuation-in-part of application No. 14/251,242, filed on Apr. 11, 2014, now abandoned.

(60) Provisional application No. 61/810,705, filed on Apr. 11, 2013.

(51) Int. Cl.
| | |
|---|---|
| *B65D 27/34* | (2006.01) |
| *B65D 27/04* | (2006.01) |
| *B65D 27/14* | (2006.01) |
| *B42D 15/04* | (2006.01) |

(52) U.S. Cl.
CPC ........... *B65D 27/04* (2013.01); *B42D 15/042* (2013.01); *B65D 27/14* (2013.01); *B65D 27/34* (2013.01)

(58) Field of Classification Search
CPC ........ B65D 27/04; B65D 27/14; B65D 27/34; B42D 15/042
USPC .......................... 229/71, 313–316, 307, 92.8
See application file for complete search history.

(56) References Cited

U.S. PATENT DOCUMENTS

| | | | | |
|---|---|---|---|---|
| 4,887,763 A | * | 12/1989 | Sano ...................... | B65D 27/04 229/71 |
| 5,697,499 A | * | 12/1997 | Reiter .................. | B65D 85/548 206/308.1 |
| 5,775,492 A | * | 7/1998 | Ban ..................... | G11B 33/0427 206/308.1 |
| 6,182,886 B1 | * | 2/2001 | Tucker .................. | B65D 27/02 229/68.1 |
| 6,189,774 B1 | * | 2/2001 | Pearson ................. | B65D 27/04 229/71 |
| 6,230,964 B1 | * | 5/2001 | Saito ...................... | B65D 75/22 206/462 |
| 7,156,288 B2 | * | 1/2007 | Liddell .................. | B65D 27/02 206/308.1 |
| 7,578,389 B1 | * | 8/2009 | Haas ...................... | B65D 27/00 206/312 |
| 7,798,392 B2 | * | 9/2010 | Potter .................... | B65D 27/06 206/308.1 |

(Continued)

FOREIGN PATENT DOCUMENTS

WO         WO 9737350 A1 * 10/1997 ........... B42D 15/045

*Primary Examiner* — Jes F Pascua
(74) *Attorney, Agent, or Firm* — Assouline & Berlowe, P.A.; Loren Donald Pearson

(57) ABSTRACT

A bend and tear postcard with pocket, having flaps 1 extending from an interior graphics side and an exterior graphics side of a postcard. The flaps fold inwards toward the interior graphics side at fold of flaps. Flaps extend from the interior graphics side and the exterior graphics side of the postcard, the flaps fold inwards toward the interior graphics side. Flaps extending from the interior graphics side and the exterior graphics side of the postcard, the flaps fold inwards toward the interior graphics side and are glued to a glue area of the interior graphics side. A peelable adhesive strip or glue adheres to a bend and tear-away closure.

15 Claims, 11 Drawing Sheets

(56) References Cited

U.S. PATENT DOCUMENTS

| | | | | |
|---|---|---|---|---|
| 8,127,921 B2* | 3/2012 | Wiesinger | ............ | G11B 33/0422 |
| | | | | 206/308.1 |
| 8,342,390 B2* | 1/2013 | Potter | ................... | B65D 27/06 |
| | | | | 206/308.1 |
| 2003/0230626 A1* | 12/2003 | Rones | ................... | B65D 27/34 |
| | | | | 229/300 |
| 2006/0006080 A1* | 1/2006 | Gustafsson | ............ | B42D 15/045 |
| | | | | 206/308.1 |
| 2006/0283729 A1* | 12/2006 | Feffer | ............... | G11B 33/0494 |
| | | | | 206/232 |
| 2007/0023490 A1* | 2/2007 | Cotognini | ............ | G11B 33/0422 |
| | | | | 229/92.8 |
| 2008/0290144 A1* | 11/2008 | Makofsky | ............. | B65D 81/03 |
| | | | | 229/68.1 |

\* cited by examiner

BEND AND TEAR POSTCARD WITH POCKET

CROSS-REFERENCE TO RELATED APPLICATIONS

This is a continuation-in-part application of application Ser. No. 14/251,242, filed Apr. 11, 2014, which claims the benefit of U.S. Provisional Application No. 61/810,705, filed on Apr. 11, 2013, both of which are hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to mailers, and more particularly to mailers for sending media such as compact discs.

Description of the Related Art

Applicant believes that one of the closest references corresponds to U.S. Pat. No. D657,416 issued to Uvalda Lynn Jordan on Apr. 10, 2011 for OPTICAL DISK MAILER.

Applicant believes that another reference corresponds to U.S. Pat. No. D621,872 issued to Uvalda Lynn Jordan on Aug. 17, 2010 for POSTCARD OPTICAL DISC MAILER.

Applicant believes that another reference corresponds to U.S. Pat. No. D706,867 issued on Jun. 10, 2014 to Uvalda Lynn Jordan for UNIVERSAL SERIAL BUS POSTCARD MAILER.

HLUCHAN US 20090013537 A1: Hluchan discloses a housing and a slider cooperatively working together to allow advertising. Hluchan does not feature a window with glassine covering. Hluchan also does not feature a stopper within the mailer created by a formulaic function of a shared edge between the flaps and the mailer width.

KARA US 20080021849 A1: Kara discloses a window covered with glassine covering. Kara does not feature a stopper within the mailer created by a formulaic function of a shared edge between the flaps and the mailer width.

PHAM U.S. Pat. No. 5,875,964: Pham discloses a bend and tear closure 66, 40 formed at top and bottom edges of the envelope separated by perforations 47, 74 and a peelable adhesive strip 73. Pham does not feature a stopper within the mailer created by a formulaic function of a shared edge between the flaps and the mailer width.

BRIEF SUMMARY OF THE INVENTION

An object of the invention is to provide a mailer with an internal pocket for securing media in a position or limited range of positions within the mailer.

It is an object of the invention to prevent damage to the mailer that is caused by shifting of the media within the mailer during shipment. The mailer itself can be used as a keepsake. So maintaining its condition during shipment is important.

It is another object of this invention to provide a mailer with pocket that protects the contents (e.g. media) housed inside of the postcard from damage during mailing.

It is another object of this invention to provide a mailer with pocket that allows for convenient removal of the contents with minimal damage to the mailer so the mailer itself can be kept as a keepsake.

It is another object of this invention to provide a bend and tear postcard with pocket that provides a printable surface that can be customized by a manufacturer or purchaser.

It is a further object to provide an opening that can seal the media during shipment but damages the mailer as little as possible when opened.

It is another object of this invention to provide a bend and tear postcard with pocket that optionally allow for the viewing of the contents (e.g. media) of the postcard via a window cutout on the postcard.

It is another object of this invention to provide a bend and tear postcard with pocket that allows for the self-closure of the postcard pocket via a peelable adhesive strip.

It is another object of this invention to provide a bend and tear postcard with pocket that is volumetrically efficient for carrying, transporting, and storage.

It is another object of this invention to provide a bend and tear postcard with pocket that can be readily assembled and disassembled without the need of any special tools.

It is another object of this invention to provide a bend and tear postcard with pocket, which is of a reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

DETAILED DESCRIPTION OF THE INVENTION

FIGS. 1 and 3-8 are views of the first embodiment of a bend and tear postcard mailer 16 for holding media 13. The bend and tear postcard assembly with pocket for holding media also can be referred to as an assembly, a mailer, or an envelope. The mailer 16 is made of card stock paper. The mailer 16 is sized to hold media 13. The mailer 16 is sized to meet local mailing sizes. The mailer 16 is preferably rectangular.

As shown in FIGS. 1, 2, and 11-13, the mailer 16 is formed from a sheet. The sheet is generally rectangular plus the addition of flaps. The sheet is folded along line 6. The graphics side 7 of the mailer 16 is on a first side of the fold line 6. The address side 8 of the mailer 16 is on a second side of the fold line 6. The graphics side 7 has an exterior graphic side 7.1 that faces outward after the sheet is folded. The graphics side 7 has an interior graphics side 7.2 that faces inward after folding the sheet. The address side 8 has an exterior address side 8.1 that faces outward after the sheet is folded. The address side 8 has an interior address side 8.2 that faces inward after folding the sheet.

Figure 1:
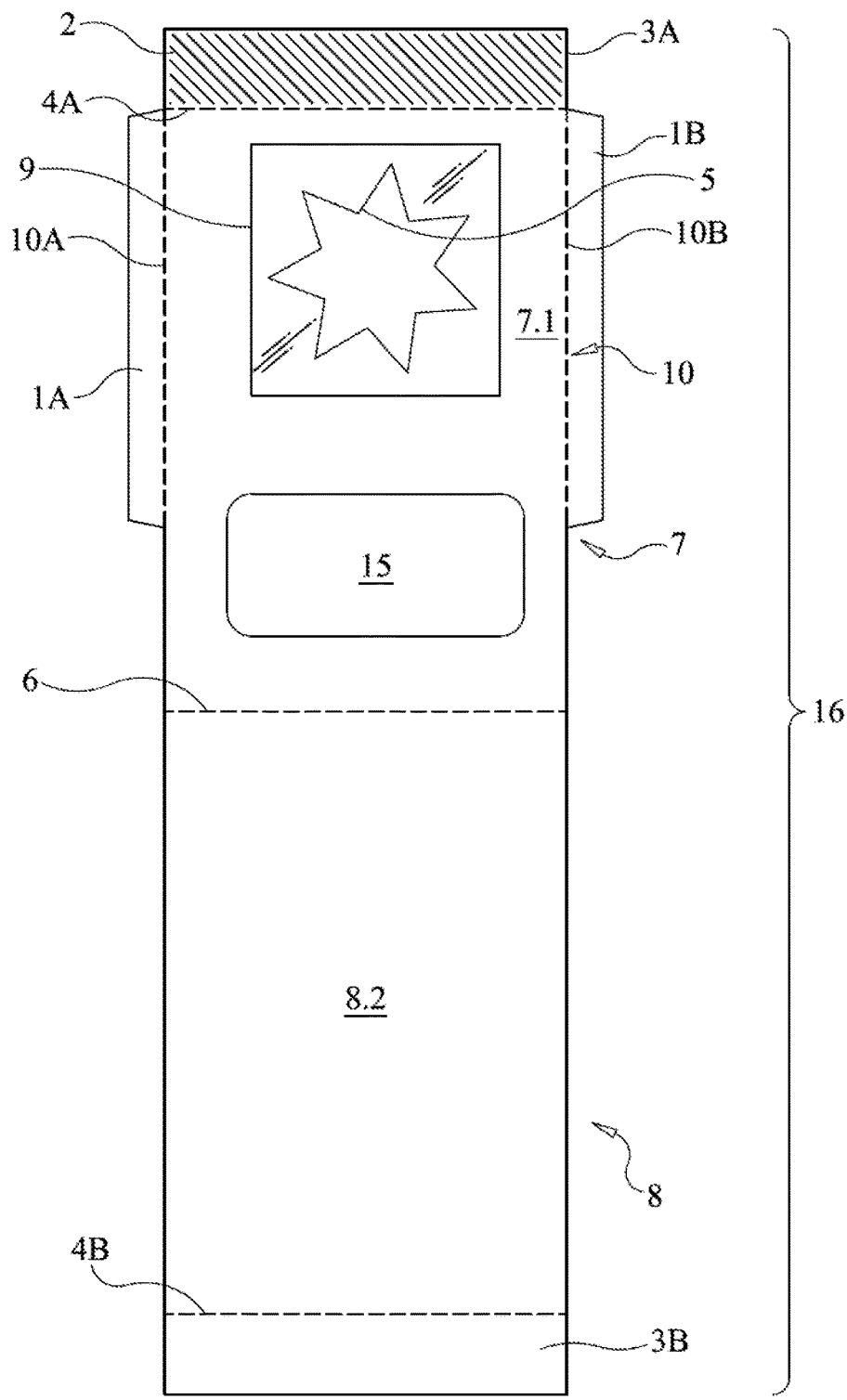
FIG. 1 is a diagrammatic rear view of a first embodiment of a mailer according to the invention showing the mailer before being folded.

FIG. 1 shows a first embodiment. Flaps 1A and 1B extend from opposing sides of graphics side 7 of mailer 16. Flaps 1A and 1B fold inward toward interior graphics side 7.2 at fold of flaps 10A and 10B, respectively.

Figure 2:
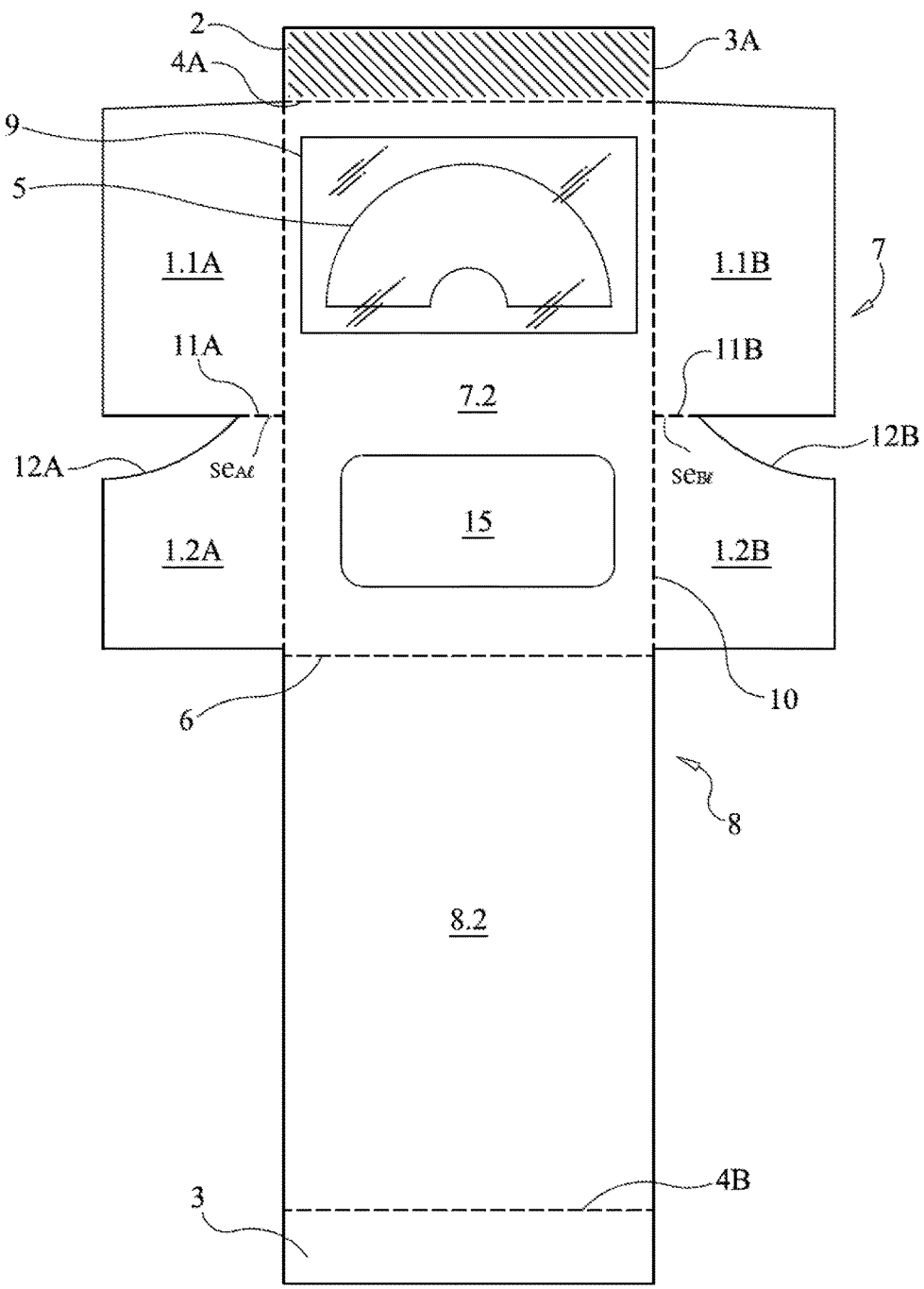
FIG. 2 is a diagrammatic rear view of a second embodiment of a mailer according to the invention showing the mailer before being folded.
Figure 3:
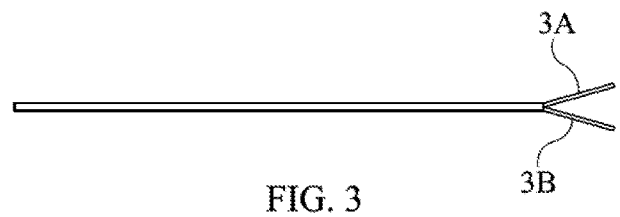
FIG. 3 is a bottom side view of the first embodiment that is shown in FIG. 1 but with the mailer being folded and before being sealed; the top view is identical to the bottom view.

FIG. 2 shows a second embodiment. Lateral flaps 1.1A, 1.1B, and medial flaps 1.2A, and 1.2B extend laterally from the graphics side 7 of mailer 16. Flaps 1.1A, 1.1B, 1.2A, and 1.2B fold inwards, toward interior graphic side 7.2.

Flaps 1.1A, 1.1B, 1.2A, and 1.2B extend from the graphics side 7 of mailer 16. Flaps 1.1A, 1.1B, 1.2A, and 1.2B fold inwards toward interior graphics side 7.2, medial flaps 1.2A and 1.2B are glued to glue area 15 of interior graphics side 7.2. Shared edges 11A and 11B connect flaps 1.1A and flap 1.2 A and flaps 1.1B and 1.2B, respectfully. A curved edge 12A on flaps 1.2A and 12B on flap 1.2B is configured to abut the contents.

The shared edges 11A and 11B connect flaps 1.1A and 1.2A and flaps 1.1B and 1.2B, respectfully. The lengths of the shared edges are chosen in order to make the curved edges 12A and 12B form a parabolic shape upon being pursed. The lengths of the shared edges 11A and 11B are marked $se_{A1}$ and $se_{B1}$. The parabolic shape of the curved edges 12A and 12B form two compact disc resting points 14, which are the support structures for a compact disc 13. See FIGS. 14-15.

Adhesive strip (peelable) or glue 2 adheres to bend & tear-away closure part 3A, as shown in FIG. 1 and FIG. 2.

Bend & tear-away closure part 3A extends from interior graphics side of postcard 7.2 and exterior graphics side of postcard 7.1. Bend and tear-away closure part 3B extends from interior address side of postcard 8.2 and exterior address side of postcard 8.1. Bend & tear-away closure parts 3A and 3B are separated from the aforementioned components by perforations 4A and 4B, respectively.

Perforation 4A separates bend & tear-away closure part 3A from interior graphics side of postcard 7.2 and exterior graphics side of postcard 7.1. Perforation 4B separates bend & tear-away closure part 3B from interior address side of postcard 8.2 and exterior address side of postcard 8.1. Perforation 4A is bent and torn away from interior graphics side of postcard 7 and exterior graphics side of postcard 7.1 and interior address side of postcard 8.2 and exterior address side of postcard 8.1 to open the pocket of the postcard. When joined with glue 3, bed & tear-away part 3A and part 3B form bend & tear-away closure 3. To open the mailer 16, the bend & tear-away closure 3 is folded and teared along perforations 4A and 4B.

Window 5 is optional and can be any shape or size. Window 5 is cut out from interior graphics side of postcard 7.2 and exterior graphics side of postcard 7.1.

Center fold line 6 separates interior graphics side of postcard 7.2 from interior address side of postcard 8.2. Center fold line 6 folds interior address side of postcard 8.2 toward interior graphics side of postcard 7.2 to close unfolded bend & tear postcard 16 and to allow glue on glue area 15 of interior graphics side 7.2 to adhere to interior address side of postcard 8.2.

Interior graphics side 7.2 of postcard is the interior area of postcard 16 within the boundary of the center fold line 6, perforation 4 and fold of flaps 10 and is not visible when postcard is closed.

Figure 4:
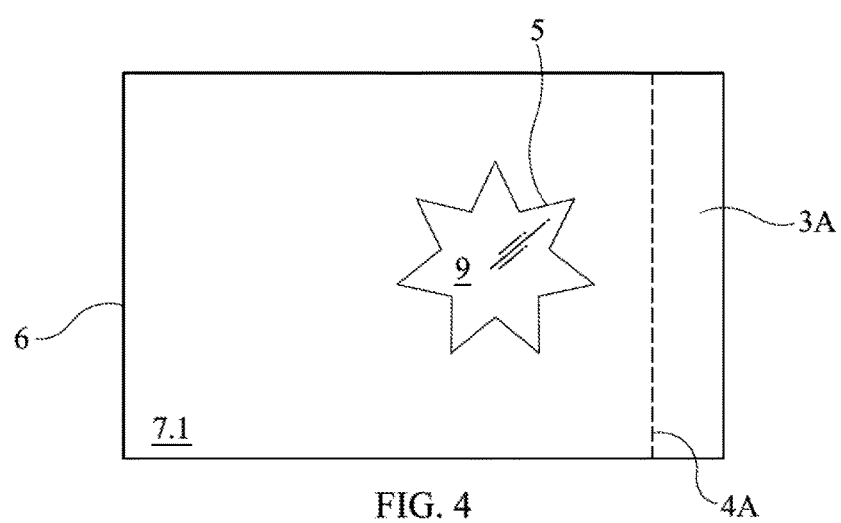
FIG. 4 is a front side view of the first embodiment.

Exterior graphics side of postcard 7.1 is the printable exterior area of postcard within the boundaries of perforation 4A and fold line 6 as seen in FIG. 4.

Glue area 15 of interior graphics side 7.2 is the area adjacent to center fold line 6 where glue is applied on interior graphics side 7.2.

Interior address side 8.2 of postcard 16 is the area within the boundaries of the center fold line 6 and perforation 4, on the side of the center fold line 6 that is opposite the interior graphics side 7.2 of postcard 16, as seen in FIG. 1 and FIG. 2.

Figures 5, 6:
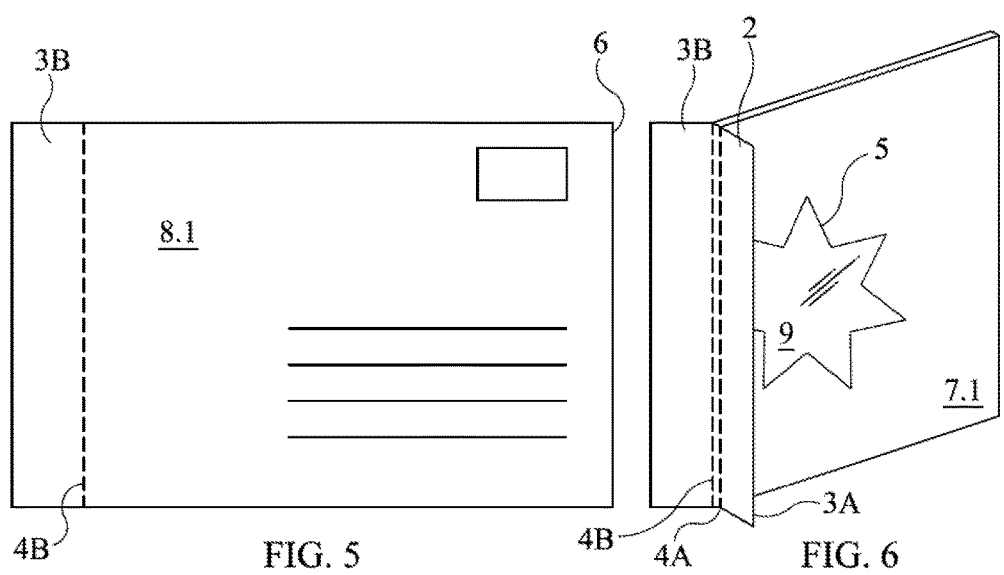
FIG. 5 is a rear side view of the first embodiment.
FIG. 6 is a front, top, right perspective view of the first embodiment.
Figure 7:
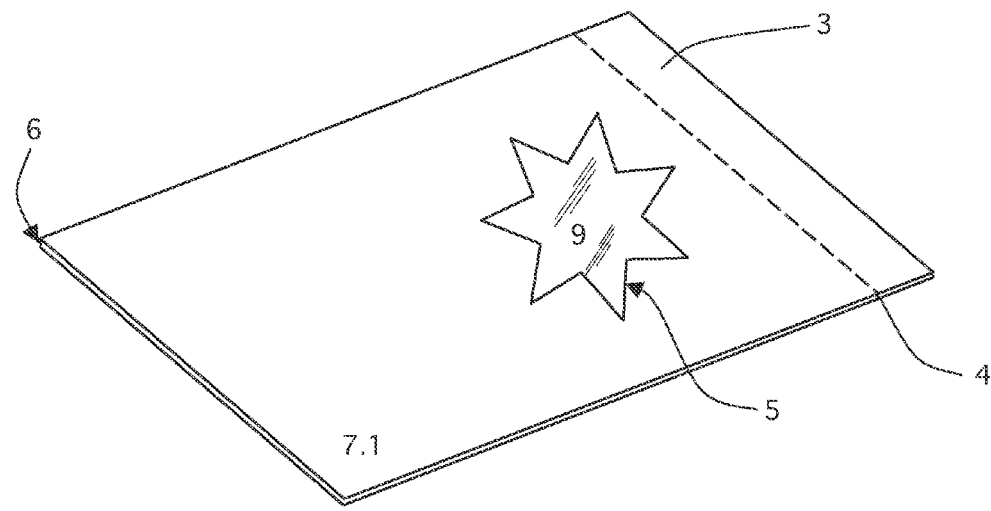
FIG. 7 is a front, top, left perspective view of the first embodiment.
Figure 8:
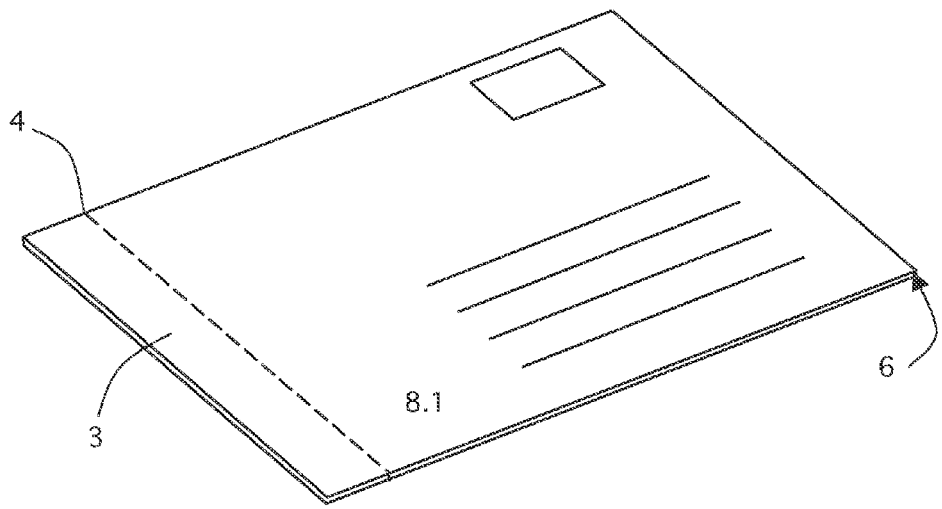
FIG. 8 is a rear, bottom, right perspective view of the first embodiment.

Exterior address side 8.1 of postcard 16 is the exterior printable area within the boundaries of center fold line 6 and perforation 4B in FIG. 5.

See-through material 9 is optional and covers window 5 and adheres to interior graphics side 7.2 of postcard 16. See-through material 9 is preferably glassine.

Folds of flaps 10A and 10B separate interior graphics side 7.2 of postcard 16 from flaps 1A and 1B in the embodiment shown in FIG. 1. In the embodiment shown in FIG. 2, the folds of flaps 10A and 10B separate interior graphics side 7.2 of postcard 16 from lateral flaps 1.1A, 1.1B, 1.2A, and 1.2B. Folds of flaps 10A and 10B fold flaps 1A and 1B, in the embodiment shown in FIG. 1, toward interior graphic side 7.2. Folds of flaps 10A and 10B fold flaps 1.1A and 1.2A and 1.1B and 1.2B, respectively. In the embodiment shown in FIG. 2, toward interior graphics side of postcard 7.2.

In operation, flaps 1A and 1B fold inwards to interior graphic side 7.2 of postcard 16. During shipping and handling, flaps 1A and 1B keep marketing material and physical media including optical discs and universal serial bus drives in place. Flaps 1.1A, 1.1B, 1.2A, and 1.2B fold inwards to interior graphics side 7.2 of postcard 16 to protect contents, create pocket and aid in keeping contents in place. Flaps 1.1A, 1.1B, 1.2A, and 1.2B, fold and are glued shut as a means of creating a barrier that prevents shifting of contents during shipping and handling and other movement. Interior address side 8.2 of mailer 16 folds at line 6 to create a pocket within postcard. Bend & tear-away closure 3 is perforated to allow for bending and tearing away. Removing bend & tear-away closure 3 opens mailer 16 and allows access to physical media and/or marketing contents within the pocket. Window 5 is optional to allow contents of pocket to be visible. See-through material 9 allows content within postcard to be visible and see-through material 9 is adhered to window 9 on interior graphics side 7.2 of postcard 16 as a means of creating a barrier 14 to protect contents from external handling. An adhesive strip (peelable) or glue 2 is affixed to bend & tear-away closure 3 as a means of sealing the pocket once contents have been inserted. To open mailer 16, bend & tear-away closure 3 is bent and torn away from body of mailer 16. Removal of bend & tear-away closure 3 permits contents in mailer 16 to be retrieved from the space between graphics side 7 and address side 8.

In an embodiment that is not shown, interior graphics side of postcard 7.2 and exterior graphics side of postcard 7.1, collectively panel 7, can be lengthened horizontally beyond the small flaps 1A and 1B such that a fold is created along the vertical line at perforation 4B, and perforation 4A on panel 7 is obviated. An additional panel will extend from the fold at perforation 4A on panel 7 and will be approximately the same length as panel 7.

To assemble the embodiment described in the previous paragraph, small flaps 1A and 1B are folded in, towards interior graphics side 7.2 of mailer 16 and glue is adhered on top of inwardly folded flaps 1A and 1B such that additional panel that extends beyond fold at perforation 4 on panel 7 folds in from the fold at perforation 4 towards panel 7 to center fold line 6 to create pocket. In this embodiment, no glue is adhered to glue area 15 of interior graphics side 7.2.

In a further embodiment, which is not shown, interior address side 8.2 of mailer 16 and exterior address side 8.1 of mailer 16, collectively address side 8, will fold at center fold line 6 inwardly toward panel 7. Bend & tear-away closure 3B on panel 8 may or may not bend. An adhesive strip (peelable) or glue 2 is adhered to bend and tear-away closure 3B on panel 8. Perforation 4B on panel 8 will remain a perforation or become a tear strip to tear away bend & tear-away closure 3 when opening. This alternative embodiment can be made from paperboard thick enough to allow it to stand with center fold line 6 in middle, panel 8 slightly bent inward towards center fold line 6 and pocket at panel 7 slightly bent inward towards center fold line 6.

This alternative embodiment may be used as a postcard or mailer, as well as a greeting card with pocket to house contents.

Alternative Uses—Alternatively, bend & tear postcard with pocket can also be used as a greeting card that can stand opened as a greeting card to display pocket, contents and/or wording inside.

Figure 9:
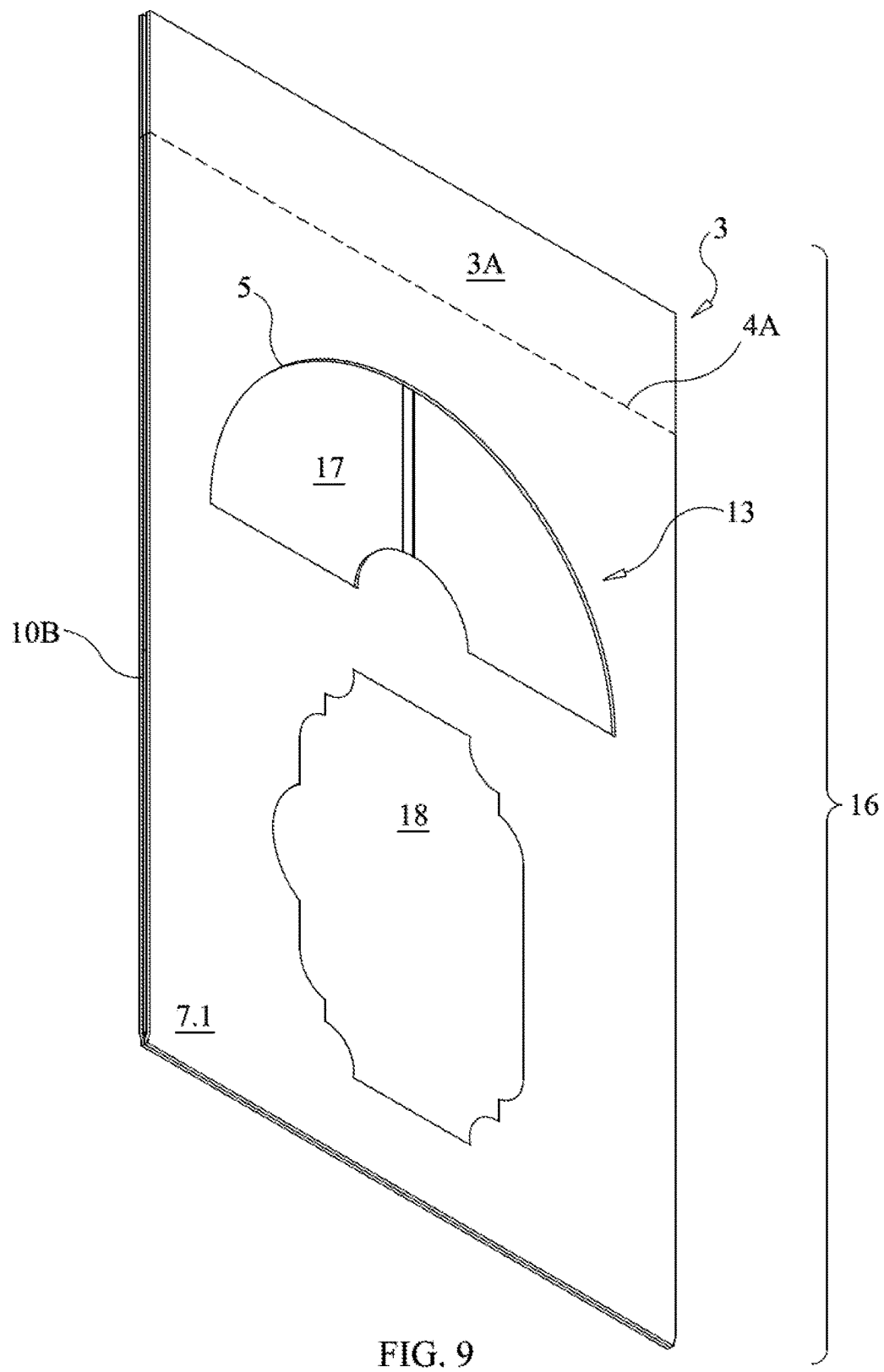
FIG. 9 is a front, top, right perspective view of the second embodiment of the mailer, which is shown in FIG. 2, but with the mailer being folded and with the opening being sealed.
Figure 10:
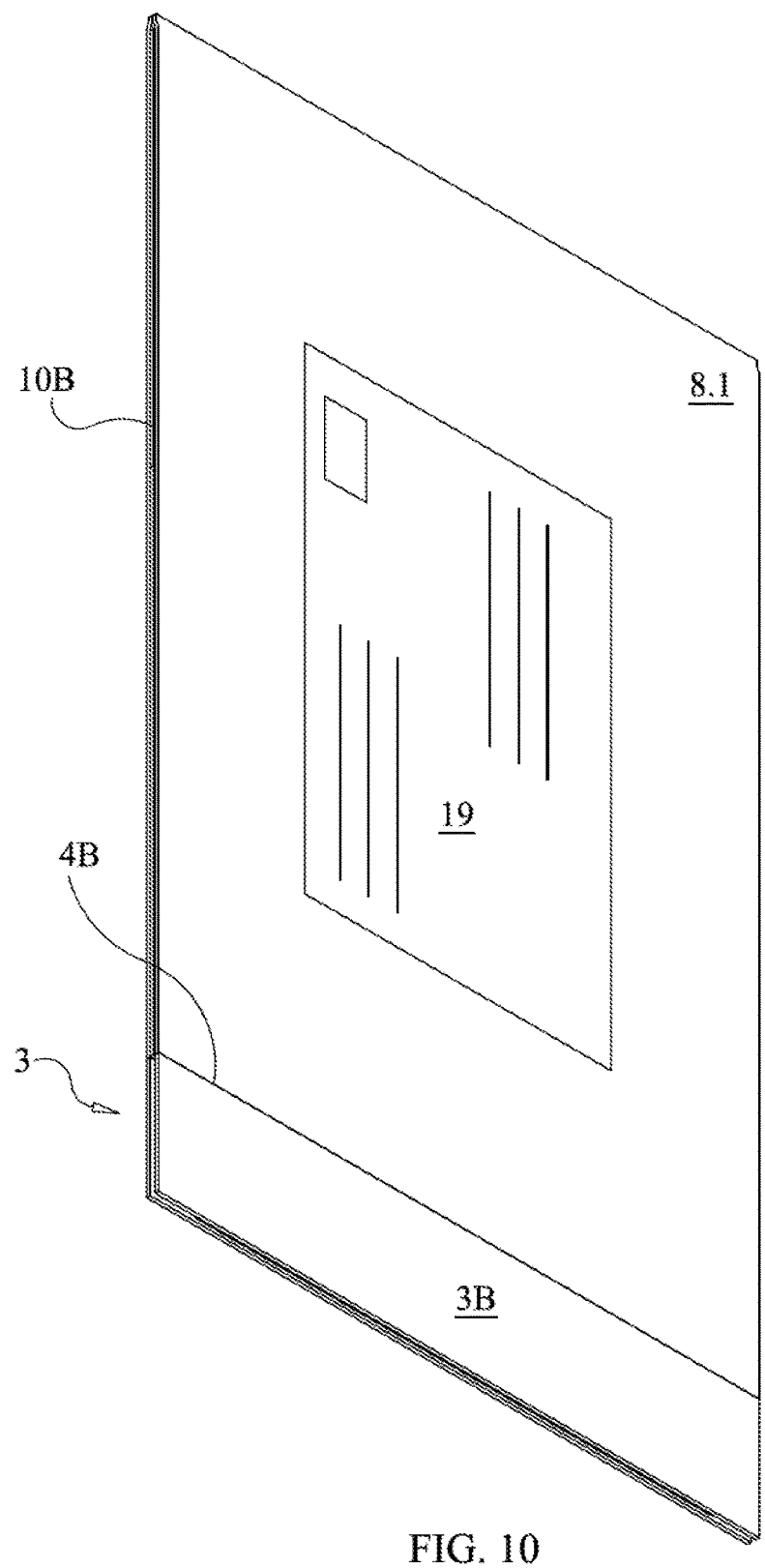
FIG. 10 is a rear, top, left perspective view of the second embodiment of the mailer.

FIGS. 9-10 show the second embodiment of the mailer 16 after being assembled. The exterior graphic side 7.1 of the mailer 16 includes a window 5. The disc 13 is viewable through the window 5 when the disc 13 is stored in the envelope 16. As detailed blow, the disc 13 is held on the compact disc resting points 14A and 14B (see FIG. 15) in a position that is viewable through the window 5. The disc 13 preferably has a label 17 that is decorative. The window 5 allows the label 17 to be viewed from outside the mailer 16. The label 17 adds to the decorative value of the mailer 16.

FIG. 10 is a view of the second embodiment assembled. The interior address side 8.2 is joined with the interior graphic side 7.2 along the fold of the flap 10B. The exterior address side 8.1 is viewable to the user upon assembly. A mailing label 19 is adhered or printed on the exterior graphic side 7.1. The bend and tear away closure 3 is intended to allow the user to access the media 13 that is stored inside. The bend and tear away closure 3 is favorable along perforation 4B and allows the media 13 to be accessed without disturbing the disc label 17 or the decorative artwork 18 on the exterior graphics side 7.1; see FIG. 9.

Figure 11:
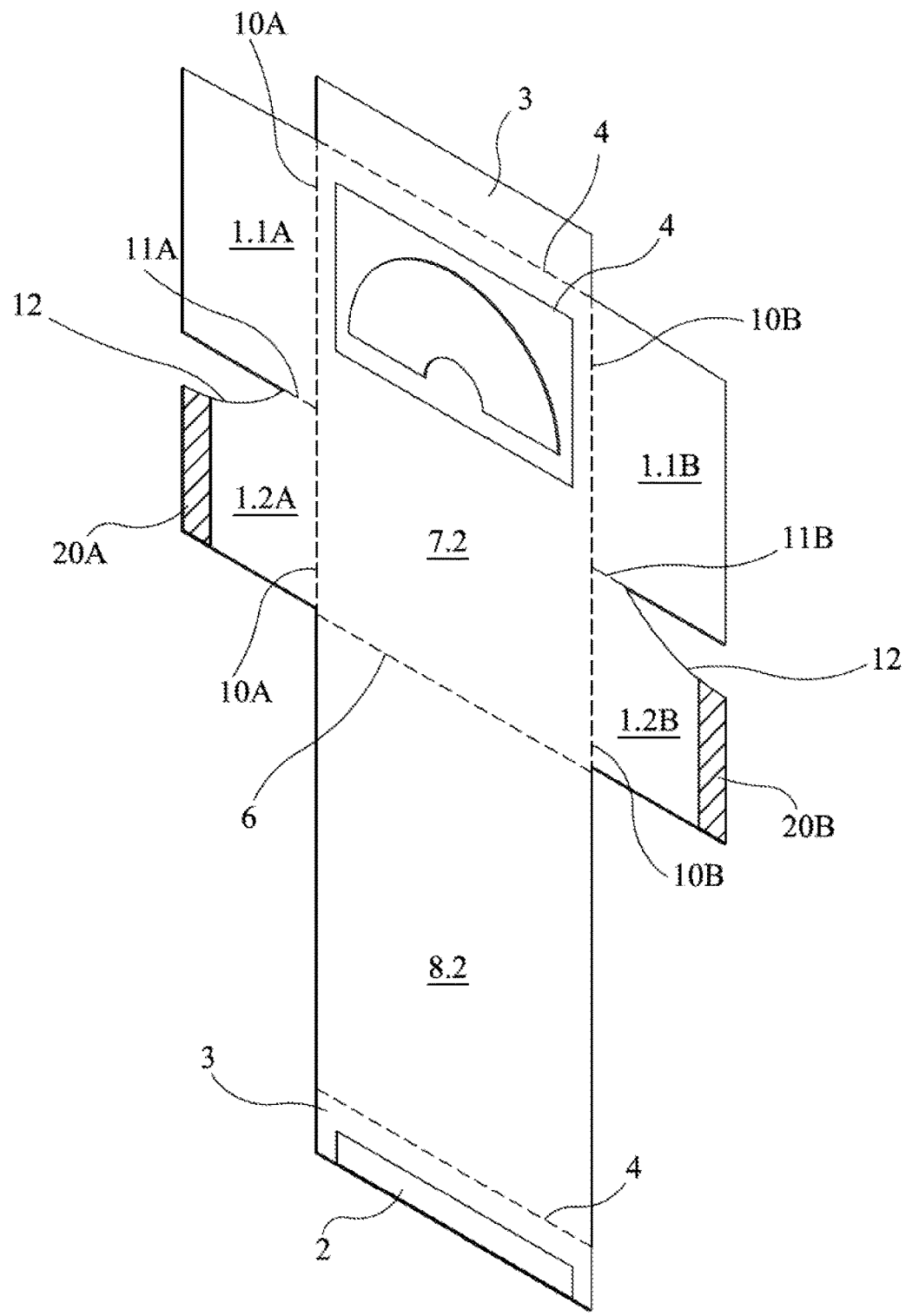
FIG. 11 is a top-right-rear isometric view of the second embodiment, which is shown in FIG. 2.

FIG. 11 is a view of the second embodiment in a disassembled state. The interior graphic side 7.2 is connected with the left large lateral flap 1.1A, right large lateral flap 1.1B, left large medial flap 1.2A, and right large medial flap 1.2B. The large flaps, 1.1A, 1.1B, 1.2A, and 1.2B, are intended to fold inward along the fold lines 10A and 10B, toward the front on the page. After the large flaps, 1.1A, 1.1B, 1.2A, and 1.2B, are folded inward, the interior graphic side 7.2 and the interior address side 8.2 are folded upward toward one another along the center fold line 6.

Figure 12:
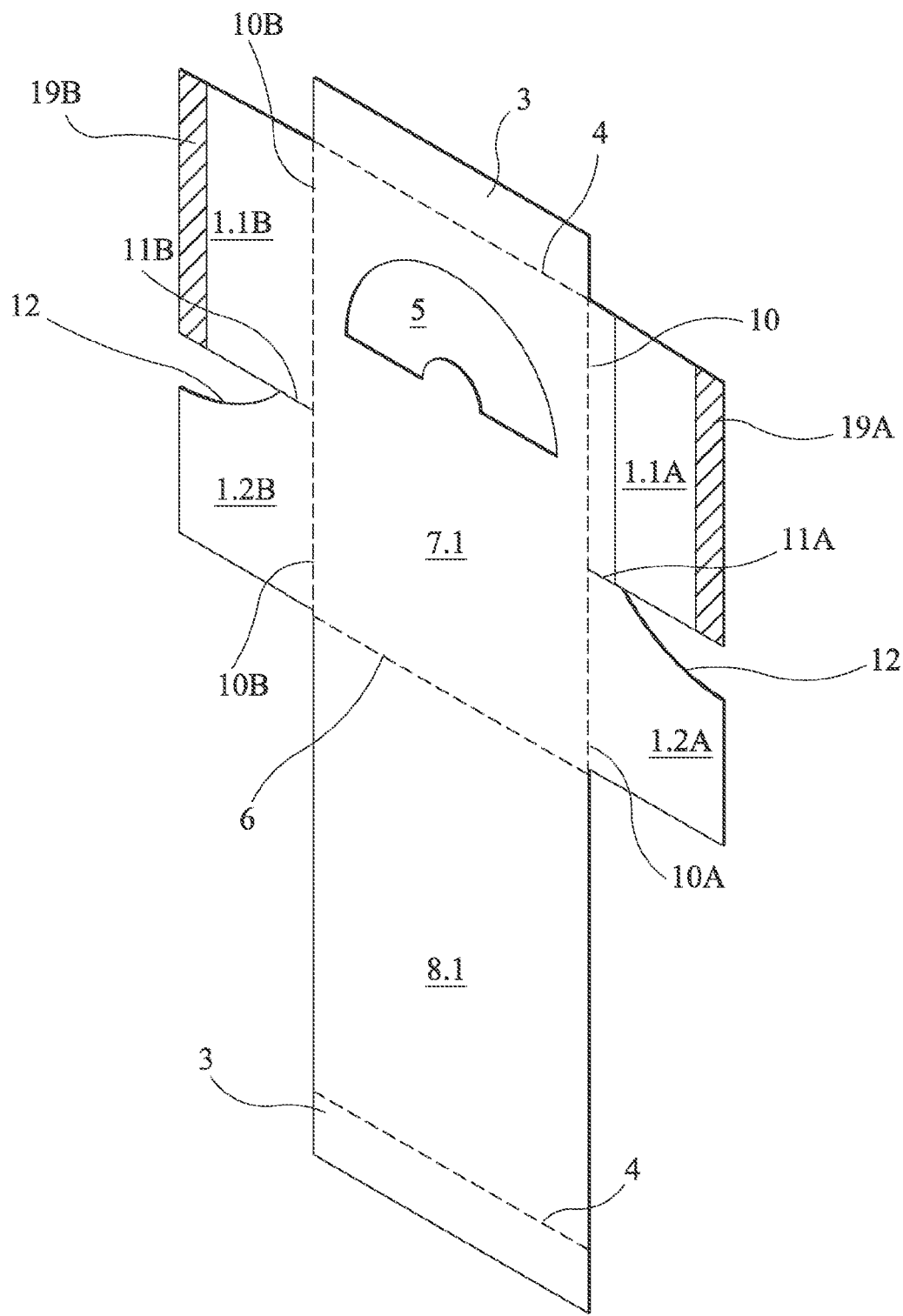
FIG. 12 is a top-left-front isometric view of the second embodiment shown in FIG. 2.

FIG. 12 is a view of the second embodiment in a disassembled state. The exterior graphic side 7.1 is connected with the left large lateral flap 1.1A, right large lateral flap 1.1B, left large medial flap 1.2A, and right large medial flap 1.2B. The large flaps, 1.1A, 1.1B, 1.2A, and 1.2B, are intended to fold outward along the fold lines 10A and 10B, toward the back of the page. After the large flaps, 1.1A, 1.1B, 1.2A, and 1.2B, are folded backward, the exterior graphic side 7.1 and the exterior address side 8.1 are folded away from one another along the center fold line 6. The correct assemblage of this embodiment is one where the exterior graphic side 7.1 and the exterior address side 8.1 are viewable by the user.

Figure 13:
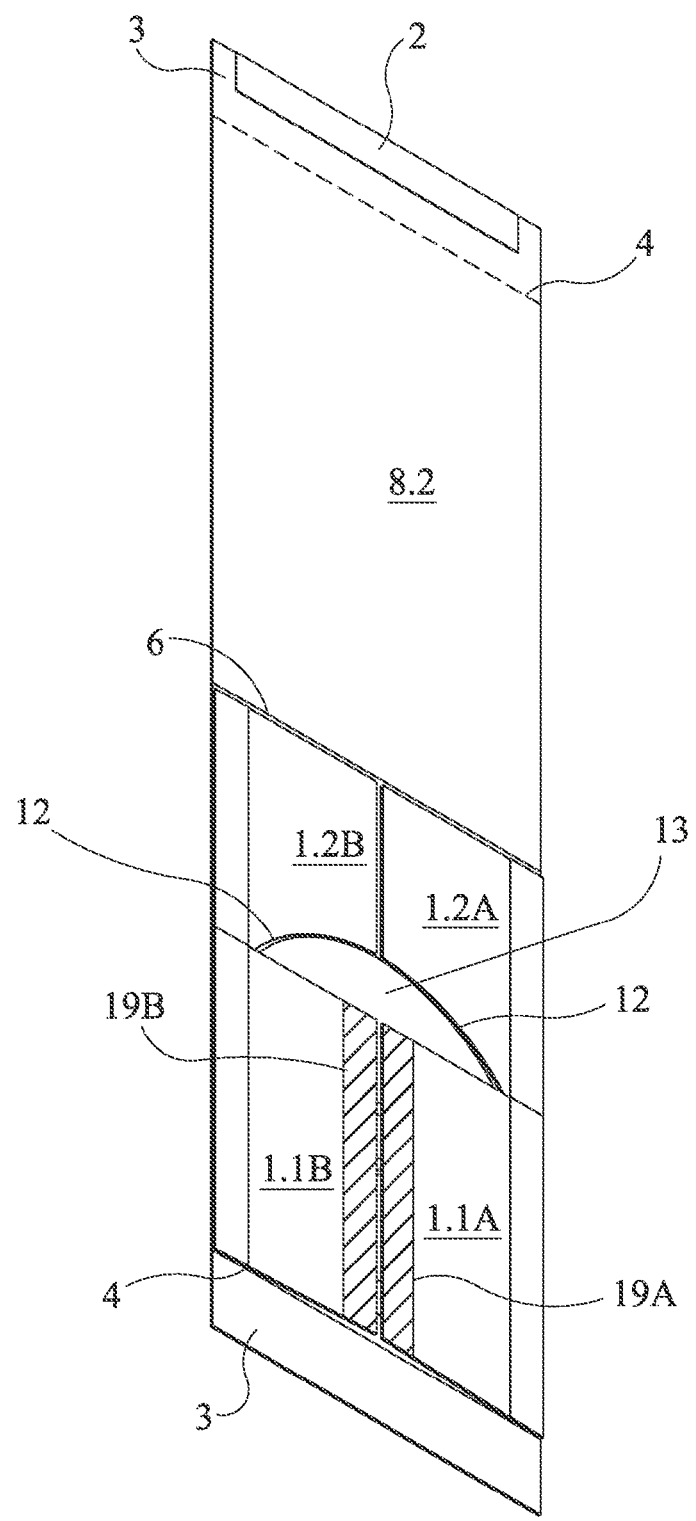
FIG. 13 is a rear-bottom-left isometric view of the second embodiment shown in FIG. 2 showing the flaps being folded and media inserted.

FIG. 13 is a view of the second embodiment in a partially assembled state. The interior graphic side 7.2 is covered by the large flaps, 1.1A, 1.1B, 1.2A, and 1.2B, once the flaps 1.1A, 1.1B, 1.2A, and 1.2B are folded inward as shown. The left large lateral flap 1.1A and right large lateral flap 1.1B are holding the disc 13 against the interior graphic side 7.2. The left large medial flap 1.2A and right large medial flap 1.2B are supporting the disc 13 to allow the disc label 17 to be viewable through the window 5 as shown in FIG. 9. The interior address side 8.2 and the interior graphic side 7.2 are intended to be bent toward one another along the center fold line 6.

Figure 14:
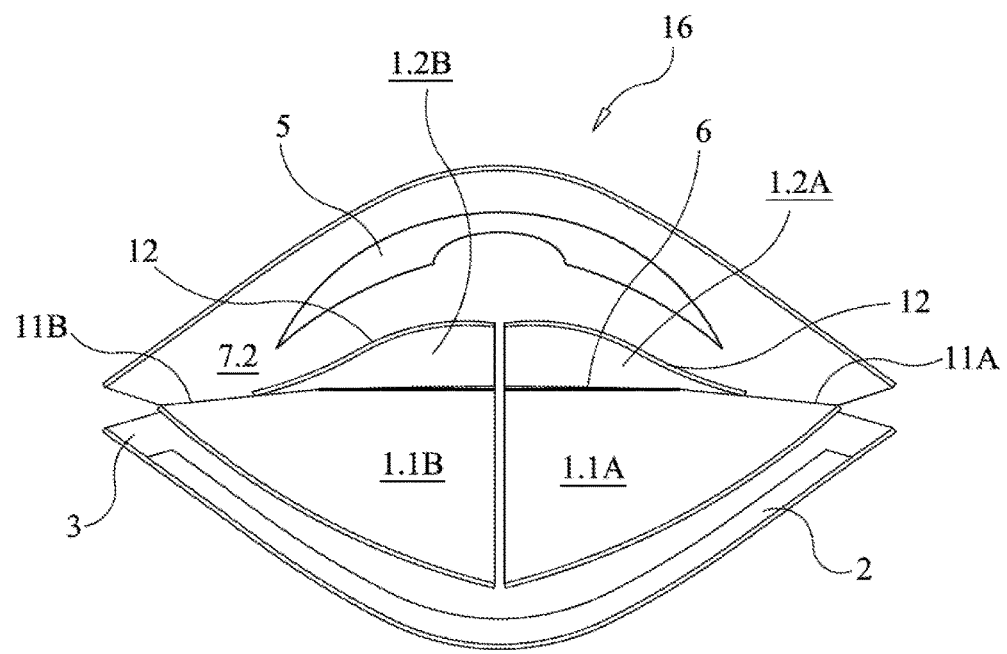
FIG. 14 is a left side view of the second embodiment shown in FIG. 9, but with the opening being unsealed and the mailer being puckered.
Figure 15:
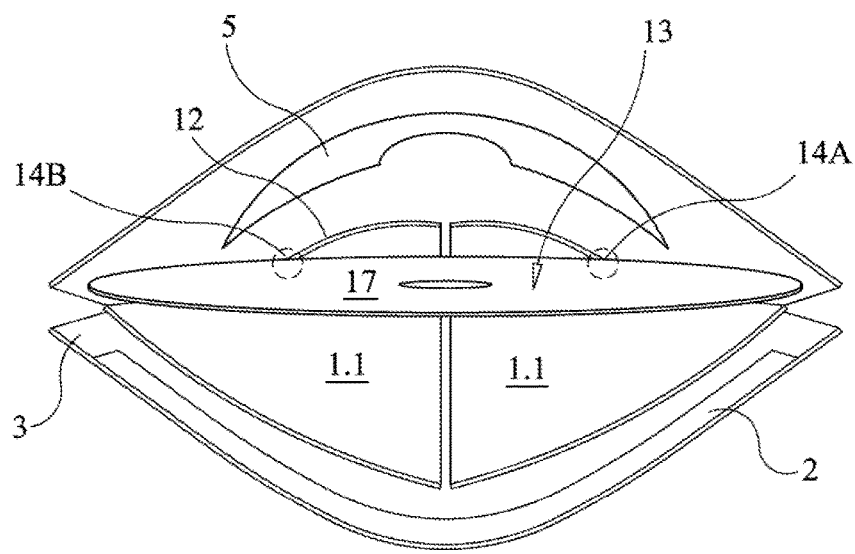
FIG. 15 is a left side view of the second embodiment shown in FIG. 14, but with media being placed in the mailer.

FIGS. 14 and 15 are top views of the second embodiment, assembled with and without a disc 13. The left large medial flap 1.2A and right large medial flap 1.2B with curved edge 12 are located in the interior of the envelope 16. The curved edge 12 is shaped into a parabolic curve. The parabolic curved edge 12 will secure disc 13 (see FIG. 15) in place in order for the disc label 17 to be viewable through the window 5 (see FIG. 7). The parabolic curved edge 12 is formed due to the shared edges 11A and 11B which is between left large lateral flap 1.1A and left large medial flap 1.2A when the envelope 16 is pursed to allow a disc 13 to be inserted. The same effect is seen along the right side between the right large lateral flap 1.1B and left large medial flap 1.2B. When pursed, the envelope 16 creates two resting points 14A and 14B; see FIG. 15. Resting point 14B is created along left large medial flap 1.2A and one resting point 14 is created along right large medial flap 1.2B.

Figure 16:
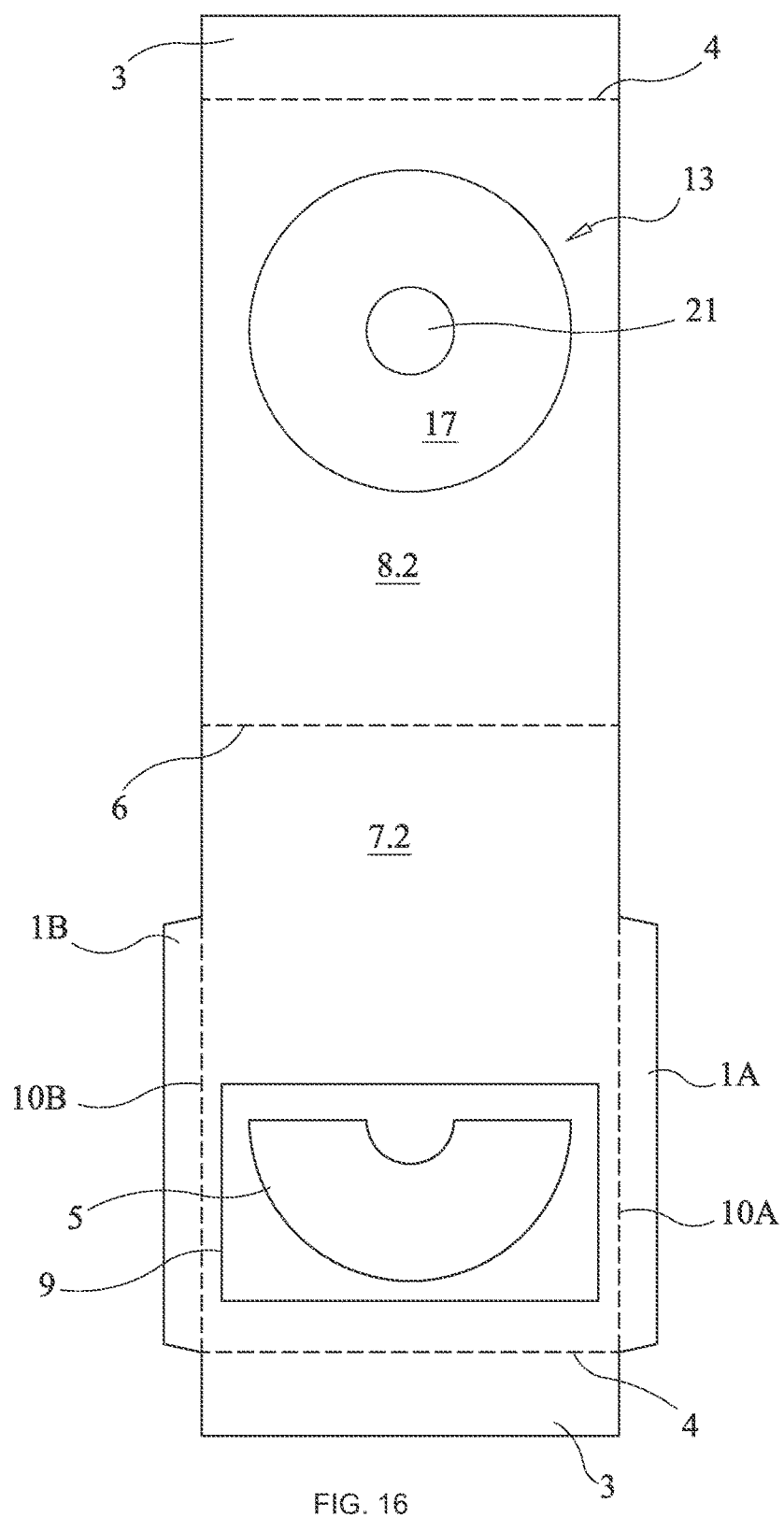
FIG. 16 is a rear side view of a third embodiment of the invention.

FIG. 16 is a top view of the second embodiment assembled with a disc 13 inside. The envelope 16 is pursed creating two resting points 14. One resting point is on the left large medial flap 1.2A and one resting point is on the right large medial flap 1.2B. The advent of the parabolic curved edge resting point 14 is intended to keep the envelope 14 as compact as possible. With the use of the parabolic curved edge resting point 14 the envelope 16 will catch the disc 13 when pursed and will keep remain compact as possible after pursing has ceased. The graphic side 7 and the address side 8 will be secured to one another by an adhesive strip 2 located on the bend and tear away closure 3. The disc 13 is accessible after the bend and tear away closure 3 is removed by tearing along the perforation 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mailer for mailing media, comprising:
   an address side configured to have a mailing address written thereon, said address side having an address-side periphery;
   a graphics side having a printable area formed thereon, said graphics side being congruent to said address side, said graphics side having a graphics-side periphery, said graphics-side periphery being connected to said address-side periphery, said address side and said graphics side defining a pocket therebetween, said pocket being configured to hold the media during mailing;
   a stopper connected to at least one of said address side and said graphics side, said stopper limiting movement of the media in the pocket during mailing, said stopper including a flap, said flap connecting said address side to said graphics side, said flap having an edge configured to abut the media during mailing, said edge being a distance from said closure at least as great as a width of the media, said flap being sandwiched between said graphics-side periphery and said address-side periphery; and
   a closure being formed on an overlapping portion of said graphics-side periphery and said address-side periphery, said closure allowing the media to be inserted between said graphics side and said address side;
   said stopper being disposed on said at least one of said address side and said graphics side at a distance from said closure, said distance being at least as great as a width of the media;
   said address side and said graphics side being rectangular when assembled;
   said graphics side having a first lateral edge and a second lateral edge, said first lateral edge opposing said second lateral edge;
   said first lateral edge including a fold of flaps;
   a first lateral flap being disposed along said fold of flaps;
   a second lateral flap being connected to said first lateral flap along a shared edge;
   said address side overlying said graphics side when assembled, a perimeter of said graphics side being attached to a perimeter of said address side except along a sealable opening when assembled and unsealed;
   said first lateral flap being adhered to only one of said graphics side and said address side when assembled;
   said second lateral flap being adhered to only one of said graphics side and said address side when assembled, said second lateral flap not being adhered to said graphics side when said first lateral flap is adhered to said graphics side, and said second lateral flap not being adhered to said address side when said first lateral flap is adhered to said address side;
   at least one of said graphics side and said address side having a window formed therein; and
   said second lateral flap being disposed further from said opening than said window.

2. The mailer according to claim 1, wherein:
   said graphics side has a window formed therein; and
   said stopper positions the media to remain visible through said window during mailing.

3. The mailer according to claim 2, wherein:
   said graphics side has an interior graphics side facing said address side; and
   see-through material is disposed on said interior graphics side and covers said window.

4. The mailer according to claim 1, wherein:
   said graphics side has a window formed therein;
   said closure is on a first side of said window; and
   said stopper is on a second side of said window.

5. The mailer according to claim 1, wherein said address side and said graphic side are formed from a sheet, said sheet being folded along a fold line to define said address side on a first side of said fold line and said graphics side on a second side of said fold line.

6. The mailer according to claim 1, wherein said closure is a bend and tear closure, said bend and tear closure including a first flap and a second flap, said first flap extending at said closure from said graphics side; said second flap extending at said closure from said address side, at least one of said first and said second flap having adhesive disposed thereon, said adhesive being configured to adhere said first flap to said second flap during mailing, a first connection between said first flap and said graphics side being scored, a second connection between said second flap and said address side being scored.

7. The mailer according to claim 1, wherein said graphic side has an exterior graphics side, said exterior graphics side facing away from said address side, said exterior graphics side having a printable area formed thereon.

8. The mailer according to claim 7, wherein said address side has an exterior address side, said exterior address side facing away from said graphics side, said exterior address side having a delivery address printed thereon.

9. The mailer according to claim 1, wherein:
   said second lateral flap is disposed along said fold of flaps.

10. The mailer according to claim 1, wherein said second lateral flap has a curved edge.

11. The mailer according to claim 10, wherein said graphic side has a glue area.

12. The mailer according to claim 1, wherein:
   said perimeter is rectangular;
   said perimeter includes said first lateral edge and said second lateral edge;
   said opening is formed along said perimeter;
   said opening is disposed between said first lateral edge and said second lateral edge;
   said second lateral edge is formed by folding a third lateral flap along a further fold of flaps;
   said third lateral flap extends laterally from said further fold of flaps before folding and assembling; and
   said third lateral flap is adhered to said graphics side when folded and assembled.

13. The mailer according to claim 12, wherein a length of said shared edge is at least as great as a distance between said first lateral edge and said second lateral edge, less a narrowest width of the media.

14. The mailer-according to claim 12, wherein a length of said shared edge is greater than a length of said first of four edges less a narrowest width of the media.

15. The mailer according to claim 1, wherein said graphics side is congruent with said address side when assembled.

* * * * *